(12) United States Patent
Yamamoto et al.

(10) Patent No.: US 7,445,552 B2
(45) Date of Patent: Nov. 4, 2008

(54) DUAL-MASS FLYWHEEL (75) Inventors: Kozo Yamamoto, Daito (JP); Hiroyoshi Tsuruta, Kadoma (JP)

(73) Assignee: Exedy Corporation, Osaka (JP)

( * ) Notice: Subject to any disclaimer, the term of this patent is extended or adjusted under 35 U.S.C. 154(b) by 206 days.

(21) Appl. No.: 10/897,030

(22) Filed: Jul. 23, 2004

(65) Prior Publication Data
US 2005/0037848 A1 Feb. 17, 2005

(30) Foreign Application Priority Data
Aug. 11, 2003 (JP) ............... 2003-291029

(51) Int. Cl.
*F16F 15/121* (2006.01)
*F16D 13/68* (2006.01)
(52) U.S. Cl. .................. 464/68.5; 192/70.17
(58) Field of Classification Search ........ 464/7, 464/68.5, 132; 192/55.61, 70.17, 212, 110 B, 192/113.5; 384/548, 572
See application file for complete search history.

(56) References Cited

U.S. PATENT DOCUMENTS 4,662,239 A * 5/1987 Worner et al. ............... 464/68.4
5,293,978 A * 3/1994 Reik et al. ................ 192/70.17
5,533,815 A * 7/1996 Schierling et al. ........... 192/207
5,622,245 A * 4/1997 Reik et al. ................ 192/55.61
5,795,080 A * 8/1998 Fujiwara et al. ............. 384/580
5,823,311 A * 10/1998 Mokdad et al. .......... 192/70.17

FOREIGN PATENT DOCUMENTS

JP    H11-287297    10/1999
KR    0206541    12/2000

* cited by examiner

*Primary Examiner*—Victor MacArthur
(74) *Attorney, Agent, or Firm*—Global IP Counselors, LLP (57) ABSTRACT A flywheel assembly with an improved bearing structure is provided. The flywheel damper (11) is a flywheel assembly for transmitting torque from the crankshaft of an engine, and has a first flywheel assembly (4), a second flywheel assembly (5), a damper mechanism (6), and a needle bearing (43). The first flywheel assembly (4) is fixed to the crankshaft (2). The second flywheel assembly (5) is disposed so as to be able to rotate relative to the first flywheel assembly (4). The damper mechanism (6) elastically connects the second flywheel assembly (5) to the crankshaft (2) in the rotation direction. The needle bearing (43) is a bearing to support rotatably the second flywheel assembly (5) on the crankshaft (2), and has a plurality of needles (44) disposed between the peripheral surfaces (21*d*) and (37*b*) of both members.

14 Claims, 7 Drawing Sheets

DUAL-MASS FLYWHEEL

BACKGROUND OF THE INVENTION

1. Field of the Invention

The present invention relates to a dual-mass flywheel. More specifically, the present invention relates to a dual-mass flywheel whereby a second flywheel is elastically connected in the rotation direction with a member on the crankshaft side.

2. Background Information

Conventionally, a flywheel is attached to a crankshaft of an engine to absorb vibrations caused by variations in engine combustion. Further, a clutch device is arranged on a transmission side (i.e., in a position axially shifted toward the transmission) with respect to the flywheel. The clutch device usually includes a clutch disk assembly coupled to an input shaft of the transmission, and a clutch cover assembly to bias the frictional coupling portion of the clutch disk assembly toward the flywheel. The clutch disk assembly typically has a damper mechanism for absorbing and damping torsional vibrations. The damper mechanism has elastic members such as coil springs arranged to compress in a rotating direction.

A structure is also known in which the damper mechanism is not arranged in the clutch disk assembly, and rather is arranged between the flywheel and the crankshaft. Specifically, the flywheel is divided into two major components such that a first flywheel is fixed to the crankshaft, and a second flywheel is connected to the crankshaft or to the first flywheel via the damper mechanism. In this structure, the flywheel is located on the output side of a vibrating system, in which the coil springs form a border between the output and input sides, so that inertia on the output side is larger than that in other prior art. Consequently, the resonance rotation speed can be lower than an idling rotation speed so that damping performance is improved. The structure, in which the flywheel and the damper mechanism are combined as described above, provides a flywheel assembly or a flywheel damper. Japanese Laid-open Patent Application No. 10-231897 shows an example of one such flywheel.

In the conventional dual-mass flywheel, the second flywheel is supported to be able to rotate via a bearing with respect to a member on the crankshaft side. The term "member on the crankshaft side" used herein refers to the crankshaft, the first flywheel, and any member fixed to the first flywheel or to the crankshaft.

A ball bearing or bushing, for example, is used as the bearing. The ball bearing is usually composed of an inner race, an outer race, and a plurality of balls. The bushing is made of a cylindrical standalone member.

A ball bearing, as such, has drawbacks in that it has a relatively high cost and that its large radial dimension occupies a relatively large amount of space. A ball bearing also inherently has low rigidity in the bending direction of the axle, and is therefore unable to create adequate resistance to bending vibrations when a dual-mass flywheel is used. In other words, the members that are supported by the ball bearing can easily move around and/or on the ball bearing in the axial direction.

A bushing has low wear resistance and the clearance thereof is difficult to manage, so the gap between the bushing and the peripheral surfaces of the first and second flywheels can easily become unnecessarily large.

In view of the above, it will be apparent to those skilled in the art from this disclosure that there exists a need for an improved dual-mass flywheel. This invention addresses this need in the art as well as other needs, which will become apparent to those skilled in the art from this disclosure.

SUMMARY OF THE INVENTION

An object of the present invention is to improve a bearing structure for a dual-mass flywheel.

A dual-mass flywheel according to a first aspect of the present invention transmits torque from the crankshaft of an engine. The dual-mass flywheel is provided with a first flywheel, a second flywheel, a damper mechanism, and a needle bearing. The first flywheel is fixed to the crankshaft. The second flywheel is disposed to be capable of rotation relative to the first flywheel. The damper mechanism elastically connects the second flywheel in the rotation direction with a member on the crankshaft side. The needle bearing rotatably supports the second flywheel on the member on the crankshaft side. Further, the needle bearing has a plurality of needles disposed between the peripheral surfaces of both members. The term "member on the crankshaft side" used herein refers to the crankshaft itself, or to the first flywheel or other member fixed to the crankshaft.

A needle bearing is used as a bearing to support the second flywheel to be able to rotate on a member on the crankshaft side in this dual-mass flywheel, and durability is therefore enhanced and clearance management facilitated.

A dual-mass flywheel according to a second aspect of the present invention is the dual-mass flywheel of the first aspect, wherein the plurality of needles is in direct contact with at least one of the peripheral surfaces of either the second flywheel or the member on the crankshaft side. In this dual-mass flywheel, the plurality of needles is in direct contact with the peripheral surface, so there is no need for an inside and outside wheel in that portion. The number of parts is therefore reduced, and the structure is simplified.

A dual-mass flywheel according to a third aspect of the present invention is the dual-mass flywheel of the first or second aspects, wherein the needle bearing also has a retainer to hold the plurality of needles. In this dual-mass flywheel, the plurality of needles is held by the retainer, so the positioning in the circumferential direction of the plurality of needles is stabilized.

A dual-mass flywheel according to a fourth aspect of the present invention is the dual-mass flywheel of any of the first to third aspects, wherein the needle bearing further has a lubricant filled into the space between the peripheral surfaces that contain the bearing, and also has a seal member to seal the lubricant in the space. In this dual-mass flywheel, a lubricant is filled into the space in which the needle bearing is contained, so friction in the bearing portion is reduced.

A dual-mass flywheel according to a fifth aspect of the present invention is the dual-mass flywheel of the fourth aspect, wherein the seal member is composed of an O-ring. In this dual-mass flywheel, since an O-ring is used, there is no need for a special structure to accommodate the seal member, and the structure is simplified.

A dual-mass flywheel according to a sixth aspect of the present invention is the dual-mass flywheel of any of the first to third aspects, wherein the plurality of needles or the peripheral surface is treated with a lubricant. In this dual-mass flywheel, friction in the bearing portion is reduced by lubricant treatment.

A dual-mass flywheel according to a seventh aspect of the present invention is the dual-mass flywheel of any of the first to sixth aspects that is further provided with a retaining member to prevent the plurality of needles from escaping or moving from the space. In this dual-mass flywheel, the plurality of needles is prevented from escaping by the retaining member.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Overall Structure

Figure 1:
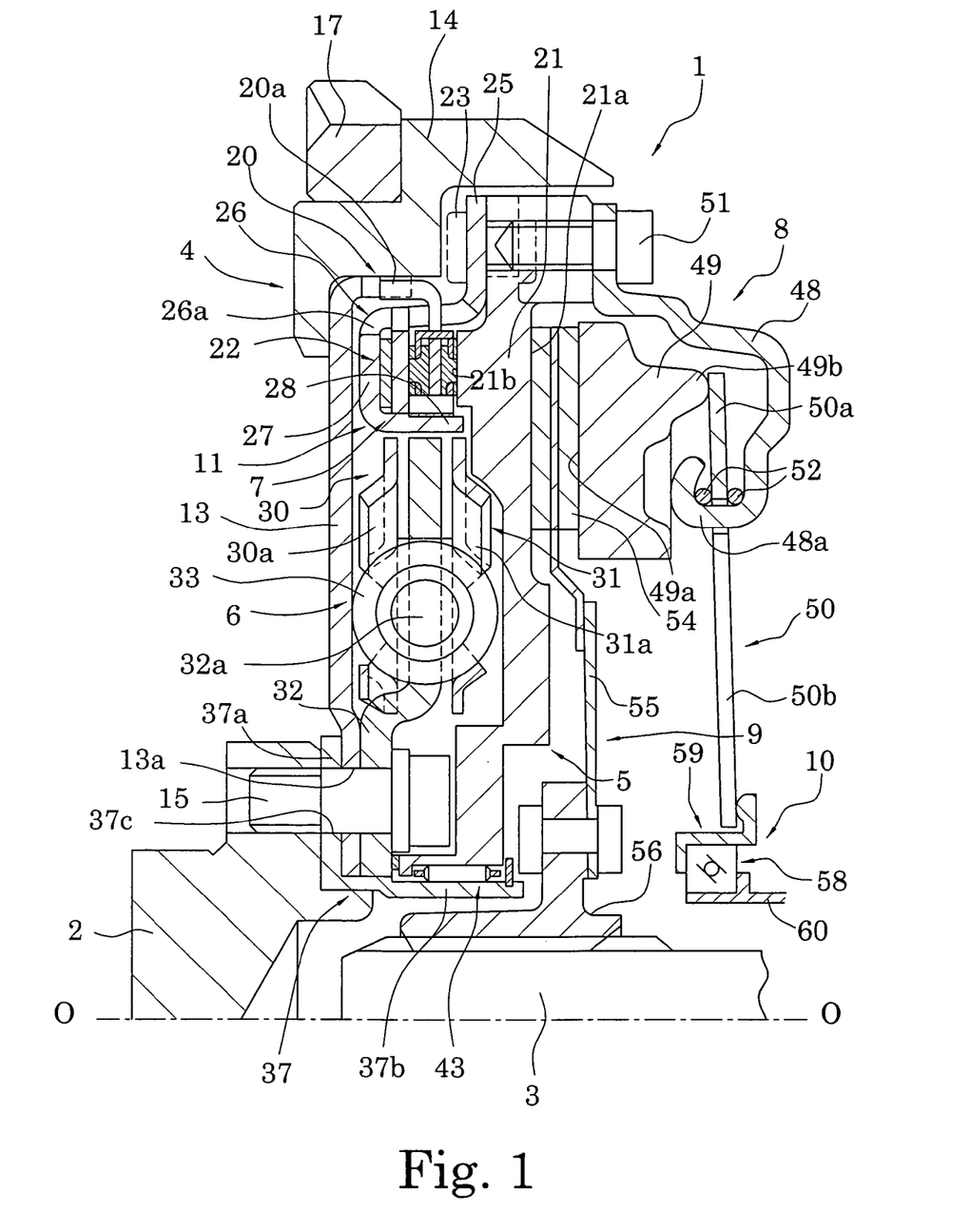
FIG. 1 is a view of a longitudinal cross-sectional schematic diagram of a dual-mass flywheel in accordance with a first preferred embodiment of the present invention.
Figure 2:
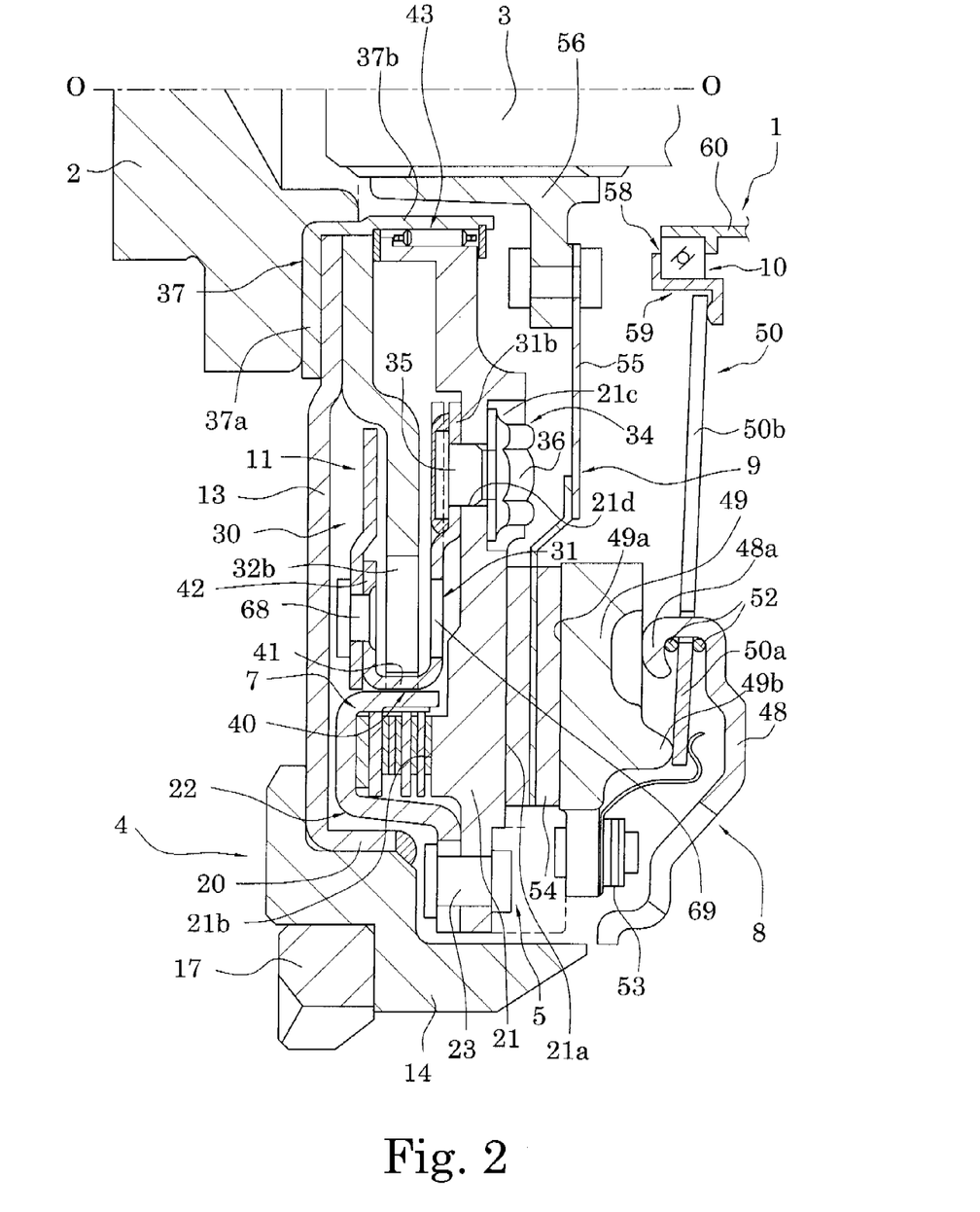
FIG. 2 is an alternate longitudinal cross-sectional schematic diagrammatical view of the dual-mass flywheel.
Figure 3:
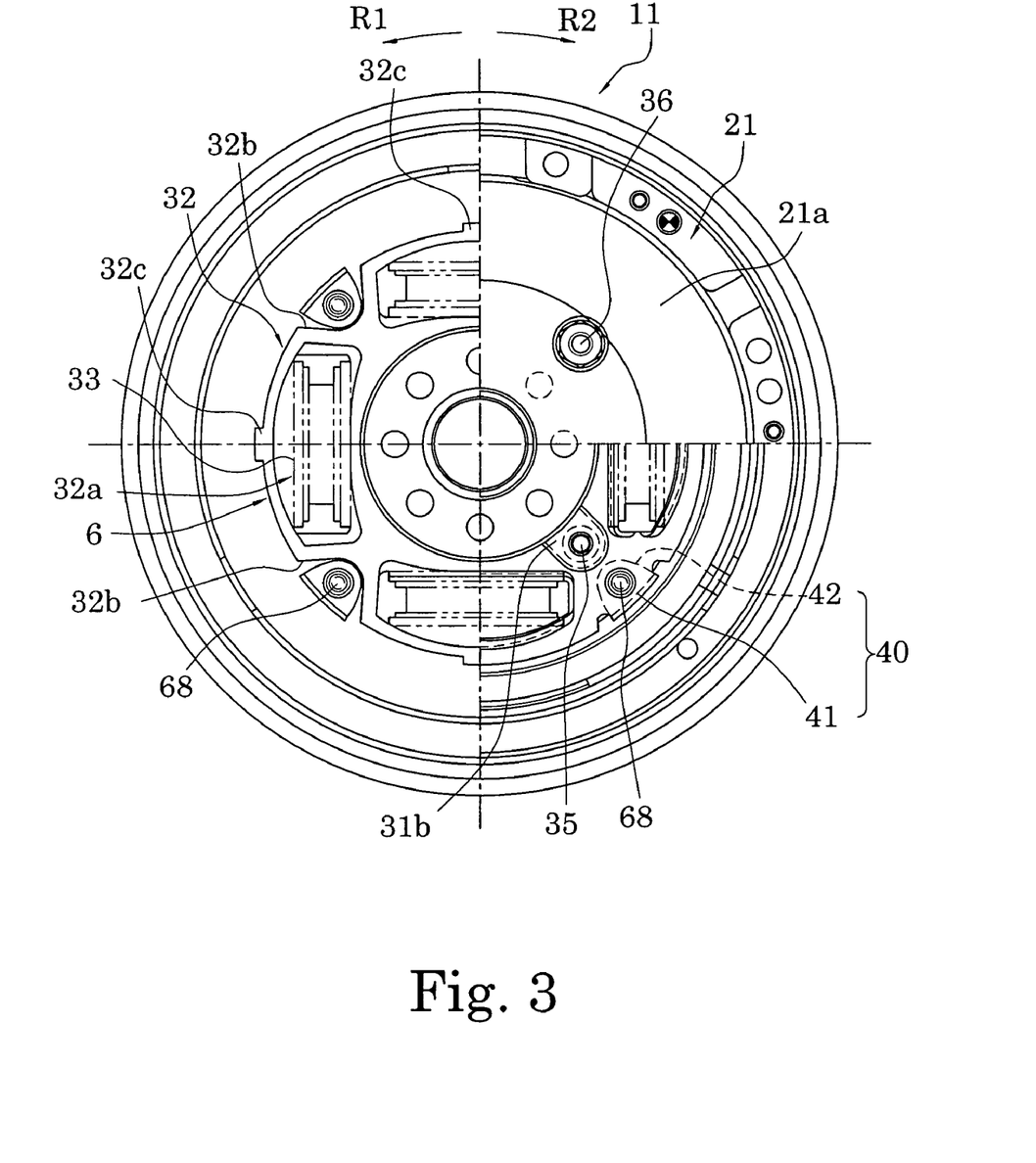
FIG. 3 is an elevational view of the dual-mass flywheel.

As shown in FIGS. 1 through 3, a clutch device 1 in accordance with a preferred embodiment of the present invention is configured to transmit and to interrupt torque between a crankshaft 2 on an engine side and an input shaft 3 on a transmission side. The clutch device 1 is primarily formed of a first flywheel assembly 4, a second flywheel assembly 5, a clutch cover assembly 8, a clutch disk assembly 9, and a release device 10. The first and second flywheel assemblies 4 and 5 are combined to form a flywheel damper 11, which includes a damper mechanism 6 and is described later.

In FIGS. 1 and 2, O-O indicates a rotation axis of the clutch device 1. An engine (not shown) is disposed on the left side in FIGS. 1 and 2, and a transmission (not shown) is disposed on the right side. In following description, the left side in FIGS. 1 and 2 will be referred to as the engine side, which is based on the axial direction, and the right side will be referred to the transmission side, which is also based on the axial direction.

First Flywheel Assembly

The first flywheel assembly 4 is fixed to an axial tip of the crankshaft 2. The first flywheel assembly 4 ensures a large moment of inertia on the crankshaft or engine side. The first flywheel assembly 4 principally includes a disk-like member 13, an annular member (inertia member) 14, and a support plate 37 (described hereinafter). The radially inner end of the disk-like member 13 is fixed to the tip of the crankshaft 2 by a plurality of bolts (fix members) 15. Bolt through-holes 13a are formed in the disk-like member 13 in positions corresponding to the bolts 15. The bolts 15 are mounted on the crankshaft 2 from the axial-direction transmission side. The annular member 14 has a thick block shape when viewed cross-sectionally, and is fixed to the axial-direction transmission side on the radially outer end of the disk-like member 13. However, as shown in the figures, the outer periphery of the annular member 14 axially extends toward the transmission side beyond the disk-like member 13. The radially outer portion of the disk-like member 13 is preferably fixed to the annular member 14 by welding. A ring gear 17 that is provided to facilitate engine startup is fixed to the outer circumferential surface of the annular member 14. The first flywheel assembly 4 may also be constructed as an integral member.

The structure of the external periphery of the disk-like member 13 will be described in detail. The external periphery of the disk-like member 13 has a flat shape. Furthermore, a cylindrical portion 20 that extends towards the transmission side in the axial direction is formed at the external peripheral edge of the disk-like member 13. The cylindrical portion 20 is supported by the internal peripheral surface of the annular member 14. A plurality of notches 20a is formed in the leading end of the cylindrical portion 20. The notches 20a extend in the rotation direction at a prescribed angle.

Second Flywheel Assembly

The second flywheel assembly 5 is principally composed of a flywheel 21 with a friction surface and a disk-like plate 22. The flywheel 21 is an annular disk-like member, and is disposed on the axial-direction transmission side of the first flywheel assembly 4. A relatively thick portion of the flywheel 21 having first and second friction surfaces 21a and 21b is disposed near a radially outer portion of the first flywheel assembly 4. The first friction surface 21a is formed on the axial-direction transmission side of the flywheel 21. The first friction surface 21a is an annular, flat surface, and is a portion that is engaged by a clutch disk assembly 9 described hereinafter. The second friction surface 21b is arranged axially opposite the first friction surface 21a to face the disk-like member 13. The second frictional surface 21b is also formed on the engine side in the axial direction in the flywheel 21 having a frictional surface. The second frictional surface 21b is annular and flat, and functions as the frictional sliding surface of the friction resistance generating mechanism 7 described hereinafter.

The circular disk plate 22 will be described. The disk-like plate 22 is disposed axially between the first flywheel assembly 4 and the flywheel 21. A radially outer portion of the disk-like plate 22 is fixed to a radially outer portion of the flywheel 21 through a plurality of rivets 23 so that the disk-like plate 22 rotates integrally with the flywheel 21. More specifically, the circular disk plate 22 is composed of the following components in order from the external peripheral edge thereof: an external peripheral fixing unit 25, an external peripheral cylindrical portion 26, a contacting portion 27, and an internal peripheral cylindrical portion 28. The external peripheral fixing unit 25 is a planar portion that is in contact with the surface of the external periphery of the flywheel 21 having a frictional surface on the engine side in the axial direction, and is fixed to the external periphery of the flywheel 21 having a frictional surface by the aforementioned rivets 23. The cylindrical portion 26 is a portion that extends toward the engine in the axial direction from the internal peripheral edge of the external peripheral fixing unit 25, and arranged radially inside the cylindrical portion 20 of the disk-like member 13. A plurality of notches 26a is formed in the cylindrical portion 26. The notches 26a are formed opposite the notches 20a of the cylindrical portion 20, and the angle thereof in the rotation direction is fairly large. Therefore, the ends of the notches 26a in the rotation direction are positioned further outside in the rotation direction than the ends of the corresponding notches 20a in the rotation direction. In other words, the rotational or circumferential length of each notch 26a is longer than that of each corresponding notch 20a. The contacting portion 27 is a portion that is disk shaped and flat, and corresponds to the friction material 19. The contacting portion 27 faces the second frictional surface 21b of the flywheel 21 having a frictional surface across a gap in the axial direction. The members of the friction resistance generating mechanism 7 are disposed within this gap. The friction resistance generating mechanism 7 is disposed between the contacting portion 27 of the circular disk plate 22 of the second flywheel assembly 5 and the flywheel 21 having a frictional surface in this manner, so a structure can be obtained that occupies less space than in the prior art. The internal peripheral cylindrical portion 28 extends toward the transmission in the axial direction, and the leading end thereof is in proximity to the flywheel 21 having a frictional surface.

The support plate 37 of the first flywheel assembly 4 is configured to support the second flywheel assembly 5 in the radial direction relative to the first flywheel assembly 4. The support plate 37 is composed of a fix portion 37a and a support portion 37b that extends to the axial-direction transmission side from the radially inner edge. The fix portion 37a is disposed between the disk-like member 13 and the tip surface of the crankshaft 2 in the axial direction. The fix portion 37a is an annular flat member and has a flat surface that extends perpendicularly to the rotational axis O-O. The fix portion 37a is received on a flat surface of the tip of the crankshaft 2. Bolt through-holes 37c are formed in the fix portion 37a in positions corresponding to the bolt through-holes 13a. According to the above-described structure, the support plate 37 is fixed to the crankshaft 2 with the bolts 15 along with the disk-like member 13 and the input disk-like plate 32. The support portion 37b preferably extends substantially in parallel to the rotational axis O-O, and preferably supports inner peripheries of the first and second flywheel assemblies 4 and 5.

Damper Mechanism

The damper mechanism 6 is described below. The damper mechanism 6 is a mechanism that elastically engages the flywheel 21 and the crankshaft 2 in the rotational direction. The damper mechanism 6 is composed of a pair of output-side disk-like plates 30 and 31, an input-side disk-like plate 32, and a plurality of coil springs 33.

The pair of output disk-like plates 30 and 31 is composed of a first plate 30 on the axial-direction engine side, and a second plate 31 on the axial-direction transmission side. Both plates 30 and 31 are disk-like members, and are disposed with a certain distance therebetween in the axial direction. A plurality of window portions 30a and 31a aligned in the circumferential direction is formed in the each of plates 30 and 31. The window portions 30a and 31a are structures that support the coil spring 33 (described hereinafter) in the axial direction and in the direction of rotation, hold the coil spring 33 in the axial direction, and have upwardly cut portions that make contact at both ends in the circumferential direction thereof.

The structure of the second plate 31 will be described in further detail. Referring to FIGS. 1, 2, and 3, four window portions 31a aligned in the circumferential direction are formed in the disk-like body of the second plate 31. Further, holes 69 used for the rivets 68 described hereinafter are formed between the window portions 31a in the circumferential direction. As shown in FIG. 3, a plurality of plate connectors 40 is integrally formed in the external peripheral edge of the disk-like body of the second plate 31 to extend towards the engine in the axial direction; specifically, towards the first plate 30. The plate connectors 40 are composed of an extender 41 and a fixing portion 42 that extends from the leading end thereof towards the inside in the radial direction. The leading end of the extender 41 generally extends in the axial direction up to the external periphery of the first plate 30. The main surface of the extender 41 is directed both ways in the radial direction; specifically, the width thereof in the radial direction matches the thickness of the plate. The fixing portion 42 is in contact with the surface of the first plate 30 on the transmission side in the axial direction, and is further fixed by the rivets 68. The plates 30 and 31 are fixed to each other in this manner to rotate in integral fashion, and their distance from each other in the axial direction is also maintained. As seen in the figures, the structure of the first plate 30 is or is with slight modifications a mirror image of the second plate 31.

The input disk-like plate 32 is a disk-like member disposed axially between the plates 30 and 31. The input disk-like plate 32 has a plurality of window holes 32a that extends in the circumferential direction. Notches 32b through which the rivets 68 described hereinafter can pass in the axial direction are formed in the input-side disk-like plate 32 in the portions between the window holes 32a in the circumferential direction. A contacting portion 32c capable of coming in contact with the extender 41 is formed in the external peripheral edge of the input-side disk-like plate 32, and this portion is shown separated from the extender 41 in the rotation direction in FIG. 3. As described above, the stopper mechanism of the damper mechanism is composed of the plate connectors 40 and the contacting portion 32c in the present embodiment. However, the stopper mechanism may also be composed of other parts.

Each coil spring 33 is made of a spring in which a large and a small spring are combined. The coil springs 33 are housed in the window holes 32a and the window portions 30a and 31a, and are supported on both sides in the radial direction and on both sides in the rotational direction thereby. Further, the coil springs 33 are supported on both sides in the axial direction by the window portions 30a and 31a.

The connecting structure 34 to connect the output-side disk-like plates 30 and 31 with the flywheel 21 having a frictional surface will next be described. The connecting structure 34 is composed of a bolt 35 and a nut 36. As shown in FIGS. 2 and 3, a plurality of fixing portions 31b cut out on the transmission side in the axial direction is formed on the internal peripheral edge of the second plate 31. The disk-like body of the second plate 31 is disposed slightly apart from the surface of the flywheel 21 having a frictional surface on the engine side in the axial direction thereof, but the fixing portion 31b is in contact with the surface on the engine side in the axial direction of the flywheel 21 having a frictional surface. Bolts 35 protruding toward the transmission in the axial direction are fixed to each of the fixing portions 31b by welding. As shown in FIG. 2, concave portions 21c and holes 21d are formed in positions corresponding to the fixing portions 31b and the bolts 35 in the flywheel 21 having a frictional surface. The concave portions 21c are formed on the transmission side in the axial direction of the flywheel 21 having a frictional surface, and the holes 21d run through the center of the concave portions 21c in the axial direction. The previously described bolts 35 are inserted into the holes 21d from the engine side in the axial direction. Nuts 36 are disposed from the transmission side in the axial direction with respect to the concave portions 21c and holes 21d, and are threaded onto the bolts 35 and secured to the bottom surface of the concave portions 21c.

Bearing Mechanism

As described above, the flywheel damper 11 (dual-mass flywheel) is composed of: the first flywheel 4, which includes the disk-like member 13 and the annular member 14, fixed to the crankshaft; the second flywheel 5, which includes the flywheel 21; and a damper mechanism 6, which includes the plates 30, 31, and 32 and the coil springs 33 to connect elastically the second flywheel 5 to the crankshaft 2 and first flywheel 4 in the rotation direction. The flywheel damper 11 also has a bearing structure to support the second flywheel 5 in the radial direction with respect to the crankshaft 2 and first flywheel 4. The bearing structure of this embodiment is a needle bearing 43. The arrangement position and structure of the needle bearing 43 will be described in detail hereinafter.

Figure 4:
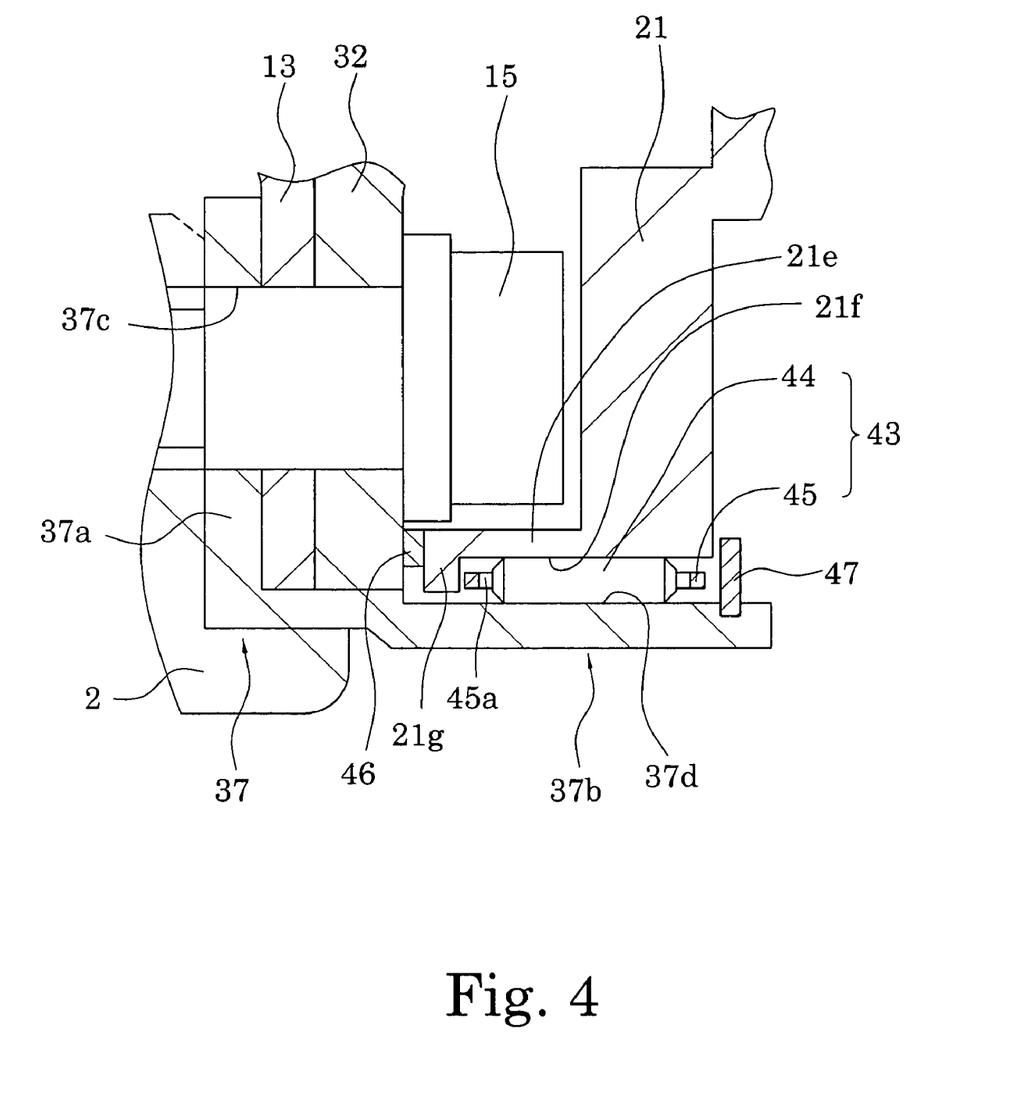
FIG. 4 is an enlarged view of a portion of the dual-mass flywheel of FIG. 1 depicting a bearing structure thereof.

As shown in detail in FIG. 4, a cylindrical portion 21e protruding towards the engine in the axial direction is formed on the internal peripheral surface of the flywheel 21 having a frictional surface. The leading end of the cylindrical portion 21e is in proximity to the input-side disk-like plate 32. An internal peripheral surface 21f of the flywheel 21 having a frictional surface (the cylindrical portion 21e constitutes a portion thereof) also faces an external peripheral surface 37d of the cylindrical support portion 37b of the support plate 37 across a slight gap in the radial direction. A flange 21g extending toward the inside in the radial direction is also formed at the leading end of the cylindrical portion 21e of the flywheel 21 having a frictional surface.

As shown in FIG. 4, the needle bearing 43 is disposed in the space between the internal peripheral surface 21f of the flywheel 21 having a frictional surface and the external peripheral surface 37d of the cylindrical support portion 37b of the support plate 37. The needle bearing 43 has a plurality of needles 44. The needles 44 are thin columnar members. The needles 44 are lined up in the circumferential direction in the aforementioned space, and each is in contact with the external peripheral surface 37d of the cylindrical support portion 37b and with the internal peripheral surface 21f of the flywheel 21 having a frictional surface. The needle bearing 43 functions as a rolling element, and when the flywheel 21 having a frictional surface rotates relative to the first flywheel assembly 4, the needle bearing itself moves in the circumferential direction while rotating between the peripheral surfaces 21f and 37d. Furthermore, the needle bearing 43 has a retainer 45. The retainer 45 is a cylindrical member and has a plurality of notched window portions 45a to accommodate the needles 44. The position of the needles 44 in the circumferential direction is stabilized by this retainer 45.

An annular thrust plate 46 is fixed on the transmission side in the axial direction of the internal periphery of the input-side disk-like plate 32. The thrust plate 46 faces the needle bearing 43 and the flywheel 21 having a frictional surface, and is capable of receiving the load of those components in the axial direction.

An annular retaining plate (retaining member) 47 is fixed to the leading or distal end of the cylindrical support portion 37b. The internal periphery of the retaining plate 47 is fixed to the cylindrical support portion 37b and is disposed on the transmission side in the axial direction of the needle bearing 43. By this retaining plate 47, the needle bearing 43 is prevented from escaping from the aforementioned space towards the transmission side in the axial direction. The needle bearing 43 is also restricted in its movement towards the engine in the axial direction by the previously described flange 21g.

Friction Resistance Generating Mechanism

Referring now to FIG. 1, the frictional resistance generation mechanism 7 functions in parallel with the coil springs 33 between the output disk-like plates 30 and 31 and the input disk-like plate 32 in the direction of rotation. The frictional resistance generation mechanism 7 generates a prescribed frictional resistance (hysteresis torque) when the crankshaft 2 rotates relative to the flywheel 21. The frictional resistance generation mechanism 7 is made of a plurality of washers that contact each other. The washers are disposed in the space between the second friction surface 21b of the flywheel 21 and the annular flat portion 27 of the disk-like plate 22.

Clutch Cover Assembly

Referring now to FIGS. 1 and 2, the clutch cover assembly 8 is a mechanism that is configured to bias a friction facing 54 of the clutch disk assembly 9 to the first frictional surface 21a of the flywheel 21 by an elastic force. The clutch cover assembly 8 is primarily formed of a clutch cover 48, a pressure plate 49, and a diaphragm spring 50. The clutch cover 48 is a disk-like member prepared by press working, and has a radially outer portion fixed to the radially outer portion of the flywheel 21 by bolts 51. The pressure plate 49, which is made of, e.g., cast iron, is disposed radially inside the clutch cover 48, and is axially located on the transmission side with respect to the flywheel 21 having the friction surface. The pressure plate 49 has a pressing surface 49a opposed to the first friction surface 21a of the flywheel 21. The pressure plate 49 is provided with a plurality of arc-shaped projected portions 49b projecting toward the transmission at the surface opposite to the pressing surface 49a. The pressure plate 49 is unrotatably and axially movably coupled to the clutch cover 48 by a plurality of arc-shaped strap plates 53. The strap plates 53 apply a load to the pressure plate 49 to bias the pressure plate 49 away from the flywheel 21.

The diaphragm spring 50 is a disk-like member disposed between the pressure plate 49 and the clutch cover 48. The diaphragm spring 50 is formed of an annular elastic portion 50a and a plurality of lever portions 50b extending radially inward from the elastic portion 50a. The radially outer portion of the elastic portion 50a is in axial contact with the end of each projected portion 49b of the pressure plate 49 on the transmission side.

The clutch cover 48 is provided with a plurality of tabs 48a at its inner periphery, which extend axially toward the engine and are bent radially outward. Each tab 48a extends through an aperture in the diaphragm spring 50 toward the pressure plate 49. The tabs 48a support two wire rings 52, which support axially opposite sides of the radially inner portion of the elastic portion 50a of the diaphragm spring 50. In this state, the elastic portion 50a is axially compressed to apply an axial force to the pressure plate 49 and the clutch cover 48.

Clutch Disk Assembly

The clutch disk assembly 9 has the friction facing 54 disposed between the first friction surface 21a of the flywheel 21 and the pressing surface 49a of the pressure plate 49. The friction facing 54 is fixed to a hub 56 via a circular and annular plate 55. The hub 56 has a central aperture spline-engaged with the transmission input shaft 3.

Release Device

The release device 10 is a mechanism provided to drive the diaphragm spring 50 of the clutch cover assembly 8 to perform the clutch releasing operation on the clutch disk assembly 9. The release device 10 is primarily formed of a release bearing 58 and a hydraulic cylinder device (not shown). The release bearing 58 is primarily formed of inner and outer races as well as a plurality of rolling elements arranged therebetween and can bear radial and thrust loads. A cylindrical retainer 59 is attached to the outer race of the release bearing 58. The retainer 59 has a cylindrical portion, a first flange, and a second flange. The cylindrical portion contacts the outer peripheral surface of the outer race. The first flange extends radially inward from an axial end on the engine side of the cylindrical portion and is in contact with the surface on the transmission side of the outer race in the axial direction. The second flange extends radially outward from an end on the engine side of the cylindrical portion in the axial direction. The second flange is provided with an annular support portion, which is in axial contact with a portion on the engine side of the radially inner end of each lever portion 50*b* of the diaphragm spring 50.

A hydraulic cylinder device is primarily formed of a hydraulic chamber forming member and a piston 60. The hydraulic chamber forming member and the cylindrical piston 60 arranged radially inside the member define a hydraulic chamber between them. The hydraulic chamber can be supplied with a hydraulic pressure from a hydraulic circuit. The piston 60 has a substantially cylindrical form and has a flange which is in axial contact with a portion on the transmission side of the inner race of the release bearing 58. When the hydraulic circuit supplies a hydraulic fluid into the hydraulic chamber, the piston 60 axially moves the release bearing 58 toward the engine.

Operation

Torque Transmission

In this clutch device 1, the torque from the engine crankshaft 2 is input to the flywheel damper 11, and is transmitted from the first flywheel assembly 4 to the second flywheel assembly 5 by way of the damper mechanism 6. In this damper mechanism 6, the torque is transmitted in order from the input disk-like plate 32, the coil springs 33, and the output disk-like plates 30 and 31. In addition, the torque is transmitted from the flywheel damper 11 to the clutch disk assembly 9 with the clutch in an engagement state, and is finally output to the input shaft 3.

Absorption and Attenuation of Torsional Vibrations

When a combustion fluctuation from the engine is input to the flywheel damper 11, the output disk-like plates 30 and 31 rotate relative to the input disk-like plate 32 in the damper mechanism 6, and the coil springs 33, of which there are preferably four, are compressed in parallel therebetween. In addition, the frictional resistance generation mechanism 7 generates a prescribed hysteresis torque. The torsional vibration is absorbed and attenuated by the above-described operation. The compression of the coil springs 33 is specifically carried out between the end face in the rotational direction of the window portions 30*a* and 31*a* of the output disk-like plates 30 and 31, and an end face in the rotational direction of the window hole 32*a* of the input disk-like plate 32.

Hydraulic fluid is fed into the hydraulic chamber of the hydraulic cylinder through the oil pressure channel (not shown), whereupon the piston 60 moves in the axial direction toward the engine. The release bearing 58 thereby moves the internal peripheral end of the diaphragm spring 50 in the axial direction toward the engine. As a result, the elastic portion 50*a* of the diaphragm spring 50 moves in an axial direction opposite the pressure plate 49. The pressure plate 49 thereby separates from the frictional facing 54 of the clutch disk assembly 9 by the urging force of the strap plates 53, and the clutch connection is released.

Effects of the Present Invention

The needle bearing 43 is used as a bearing to support the second flywheel assembly 5 on a member on the side of the crankshaft 2 in the flywheel damper 11 described previously, so durability is enhanced and the clearance can be more easily maintained. Furthermore, the needle bearing 43 is the bearing of the flywheel damper 11, so a large load in the bending direction can easily be applied when bending vibration is inputted from the engine side. The needle bearing 43 has high rigidity in the bending direction compared to a sleeve, so adequate resistance to bending vibration can be generated in this case as well.

The plurality of needles 44 of the needle bearing 43 is in direct contact with the internal peripheral surface 21*f* of the flywheel 21 having a frictional surface and with the external peripheral surface 37*d* of the support plate 37, so there is no need for an inside and outside wheel. The number of parts is therefore reduced, and the structure is simplified. The needle bearing may also be in contact with one of the members via a cylindrical race. The position of the plurality of needles 44 of the needle bearing 43 is maintained in part by the retaining plate 47 and in part by the flange 21*g*, so the positioning in the axial direction of the plurality of needles 44 is stabilized. Further, the circumferential direction position of the plurality of needles 44 is maintained by the retainer 45 so the positioning of the needles 44 in the circumferential direction is stabilized. The plurality of needles 44 or the peripheral surfaces 21*f* and 37*d* may be lubricated the application of a solid lubricant or the like. In this case, friction in the bearing portion is reduced.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

Alternate Embodiments

Alternate embodiments will now be explained. In view of the similarity between the first and the alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

For example, the support plate 37 may be formed in integral fashion with the disk-like member 13.

The member for supporting the second flywheel via the needle bearing may also be any of either the first flywheel, a member provided to the first flywheel, the crankshaft, or a member fixed to the crankshaft.

Furthermore, the second flywheel is not necessarily an integral member, but may be composed of a portion having a frictional surface, and a plate member having a cylindrical portion that is fixed to the first portion and is also supported by the needle bearing.

In the following embodiments, unless otherwise noted, the structure of the dual-mass flywheel is the same or substantially the same except for the needle bearings.

Figure 5:
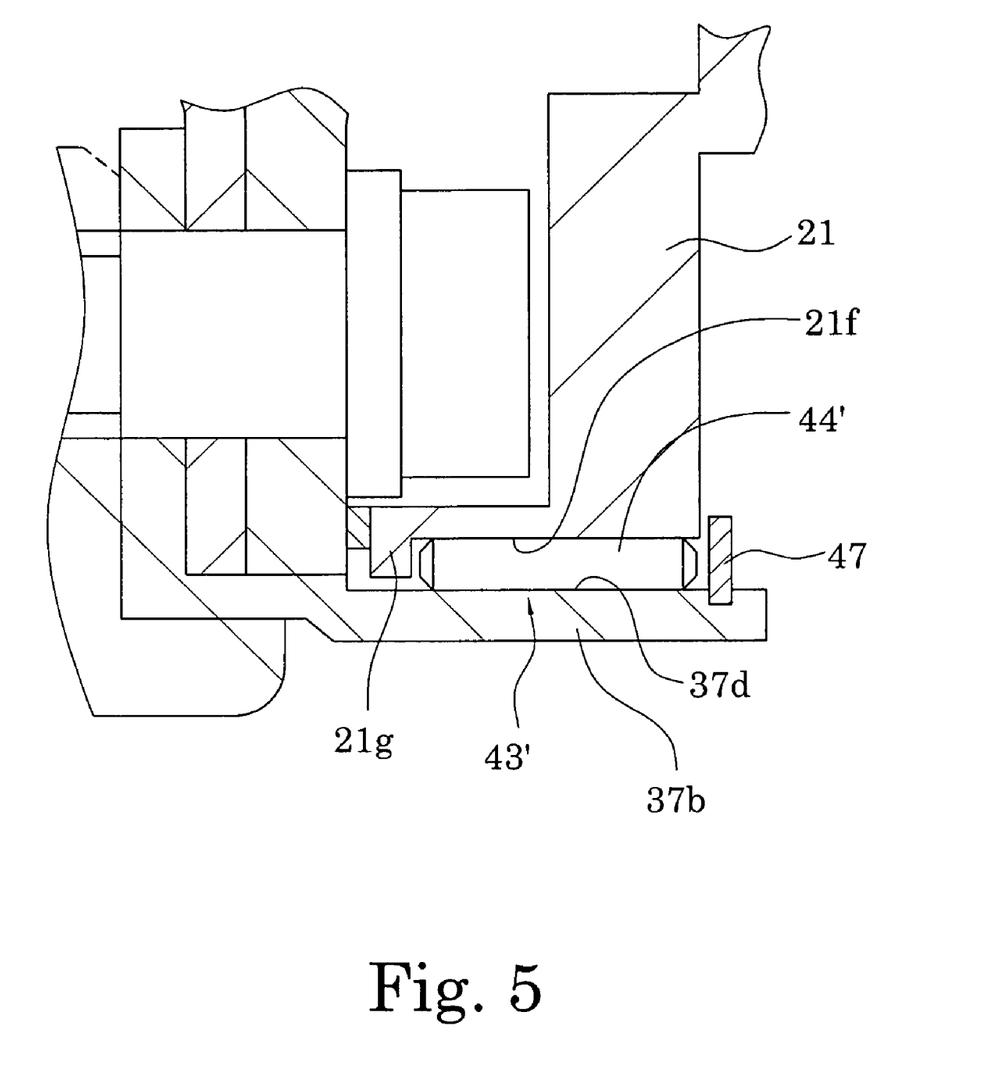
FIG. 5 is a view of a diagram of a bearing structure of a dual-mass flywheel corresponding to FIG. 4 in accordance with a second preferred embodiment of the present invention.

The needle bearing 43' shown in FIG. 5 is composed solely of a plurality of needles 44'. In other words, the needle bearing 43' differs from the aforementioned embodiment and is devoid of a retainer. In this case, the number of parts is reduced in comparison to the aforementioned embodiment.

Figure 6:
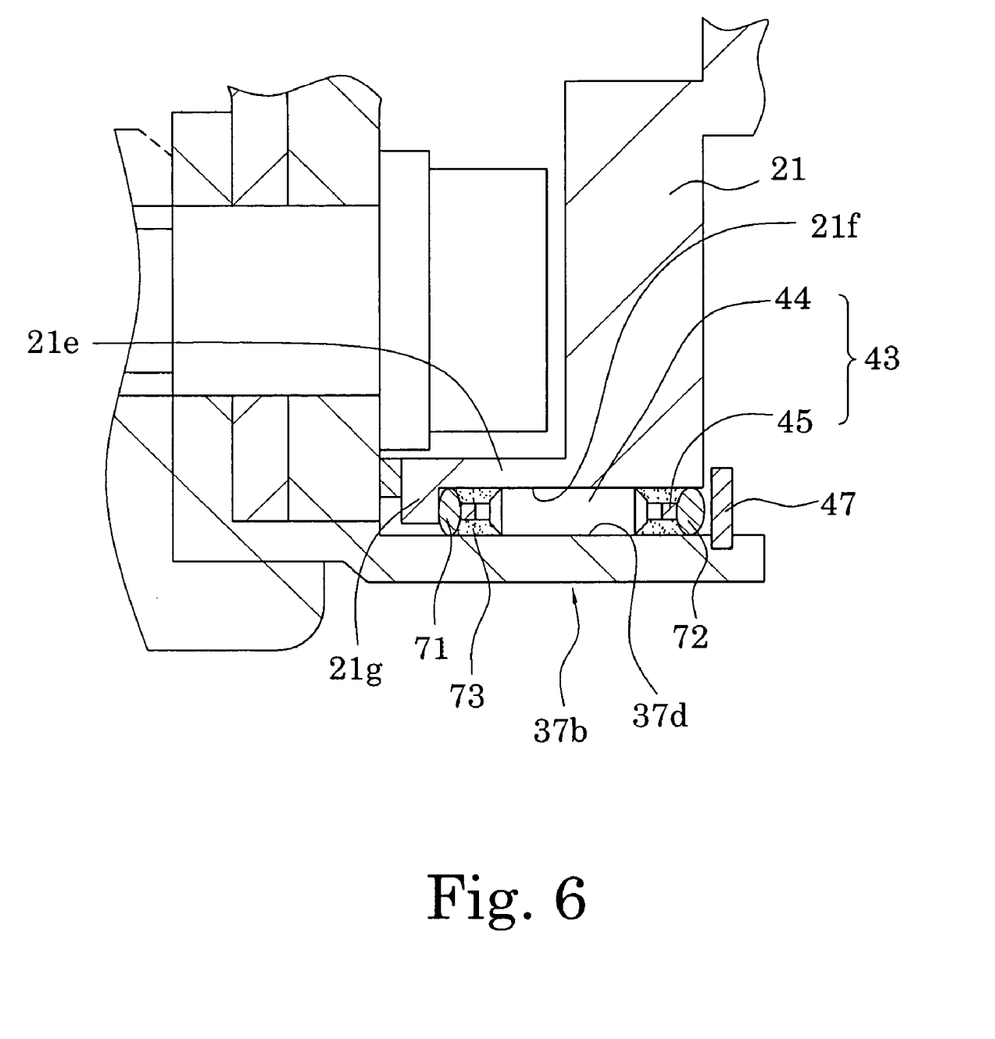
FIG. 6 is a view of a diagram of a bearing structure of a dual-mass flywheel corresponding to FIG. 4 in accordance with a third preferred embodiment of the present invention.

In the bearing structure shown in FIG. 6, lubricating oil 73 is filled into the space between the peripheral surfaces 21f and 37d that accommodate the needle bearing 43. Furthermore, O-rings 71 and 72 to seal the lubricating oil in the space are disposed on both sides of the space in the axial direction. The O-ring 71 on the engine side in the axial direction is supported by the flange 21g formed at the leading end of the cylindrical portion 21e of the flywheel 21 having a frictional surface. The O-ring 72 on the transmission side in the axial direction is supported by the retaining plate 47.

In this bearing structure, lubricating oil 73 is filled into the space containing the needle bearing 43, so friction in the bearing portion is reduced. The O-rings 71 and 72 are used as seal members, so there is no need for a special structure to accommodate the seal member, and the structure is simplified.

Figure 7:
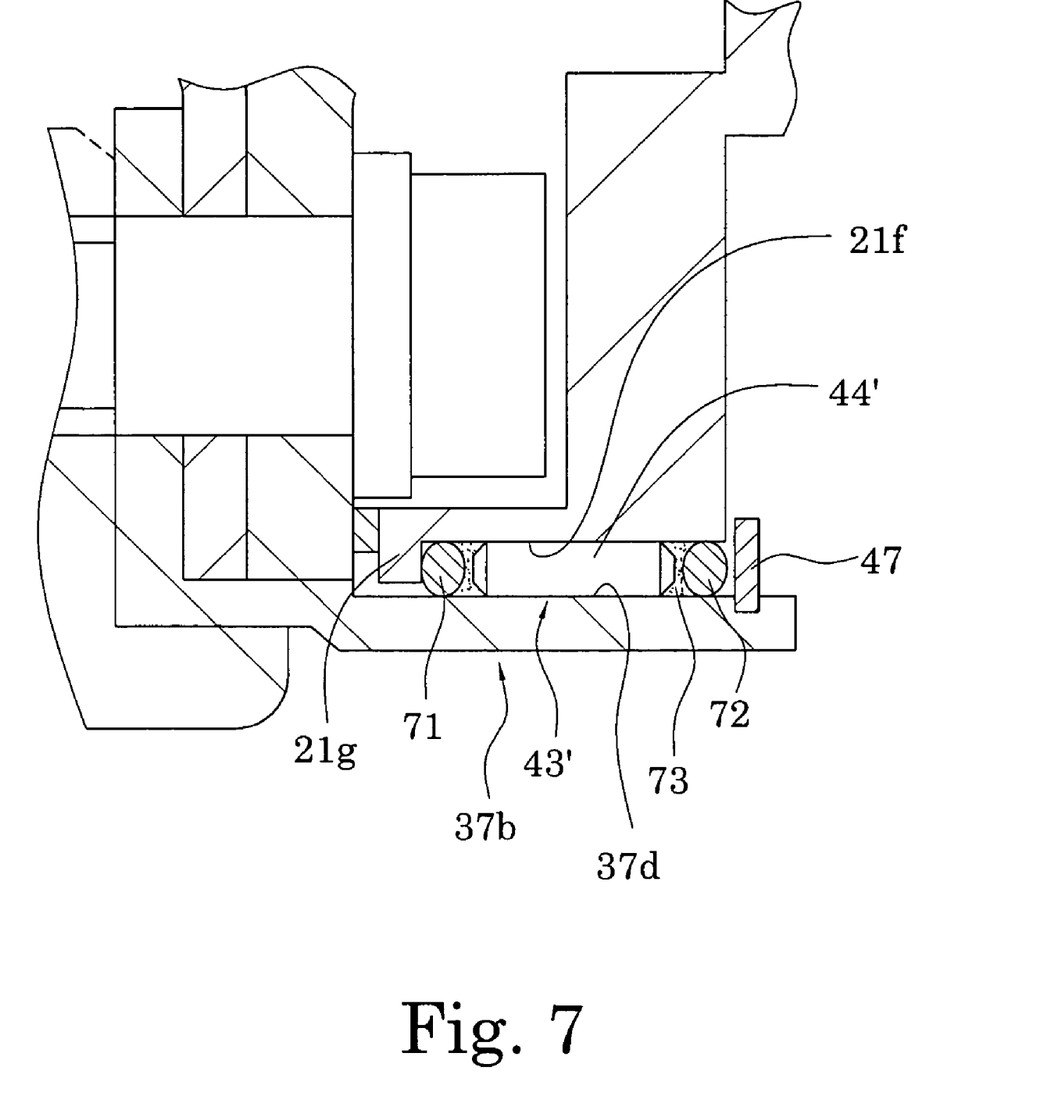
FIG. 7 is a view of a diagram of a bearing structure of a dual-mass flywheel corresponding to FIG. 4 in accordance with a fourth preferred embodiment of the present invention.

The bearing structure shown in FIG. 7 is a combination of the needle bearing 43' having no retainer and a lubricating seal structure.

A dual-mass flywheel is described in the aforementioned embodiment whereby the second flywheel is directly connected to the crankshaft via the damper mechanism, but the present invention may also be applied to a dual-mass flywheel in which the second flywheel is connected to the first flywheel via the damper mechanism. In other words, in this dual-mass flywheel, the first flywheel and second flywheel are connected to each other via the damper mechanism. Specifically, the second flywheel is connected with the crankshaft via the first flywheel. The same effects are obtained in this embodiment as in the aforementioned embodiment by means of the needle bearing 43.

INDUSTRIAL APPLICABILITY

The dual-mass flywheel pertaining to the present invention has an improved bearing structure and can be applied to a torque transmission device of a vehicle. As described above, the bearing structure of a dual-mass flywheel is improved by using a needle bearing as the bearing of the dual-mass flywheel.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-291029. The entire disclosure of Japanese Patent Application No. 2003-291029 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A dual-mass flywheel comprising:
    a first flywheel being fixed to a crankshaft of an engine, said first flywheel being configured to receive torque transmitted from said crankshaft;
    a second flywheel being configured to rotate relative said first flywheel;
    a damper mechanism being configured to connect elastically said second flywheel in a rotation direction with said first flywheel;
    a support plate being fixed to said crankshaft and having a support portion extending in an axial direction, said support plate being arranged on a crankshaft side of the first flywheel;
    a plate member being disposed between said flange and said first flywheel; and
    a bearing being configured to support rotatably said second flywheel on said support plate, said bearing comprising a needle bearing having a plurality of needles disposed between a first peripheral surface of said support plate and a second peripheral surface of said second flywheel, said bearing being supported by said support portion on an inner peripheral side of said second flywheel,
    said second flywheel having a flange extending radially inward on the crankshaft side of said bearing, and said support portion being fixed to a retaining member extending radially outward, and said bearing being arranged axially between said retaining member and said flange.

2. The dual-mass flywheel according to claim 1, wherein said plurality of needles is in direct contact with at least one of said first peripheral surface of said support plate or said second peripheral surface of said second flywheel.

3. The dual-mass flywheel according to claim 2, wherein said needle bearing further includes a retainer configured to maintain positioning of said plurality of needles in said rotational direction.

4. The dual-mass flywheel according to claim 3, wherein said needle bearing further includes,
    a lubricant filled into a space between said peripheral surfaces that contain said needle bearing, and
    a seal member to seal said lubricant in said space.

5. The dual-mass flywheel according to claim 4, wherein said seal member is an O-ring.

6. The dual-mass flywheel according to claim 3, wherein said plurality of needles or said peripheral surfaces are treated with a lubricant.

7. The dual-mass flywheel according to claim 6, wherein said retaining member is configured to maintain positioning of said plurality of needles in an axial direction.

8. The dual-mass flywheel according to claim 2, wherein said needle bearing further includes,
    a lubricant filled into a space between said peripheral surfaces that contain said needle bearing, and
    a seal member to seal said lubricant in said space.

9. The dual-mass flywheel according to claim 8, wherein said seal member is an O-ring.

10. The dual-mass flywheel according to claim 1, wherein said needle bearing further includes,
    a lubricant filled into a space between said peripheral surfaces that contain said needle bearing, and
    a seal member to seal said lubricant in said space.

11. The dual-mass flywheel according to claim 10, wherein said seal member is an O-ring.

12. The dual-mass flywheel according to claim 1, wherein said plurality of needles or said peripheral surfaces are treated with a lubricant.

13. The dual-mass flywheel according to claim 1, further comprising a retaining member to maintain positioning of said plurality of needles in an axial direction.

14. The dual-mass flywheel according to claim 1, further comprising:
a friction resistance generating mechanism generating friction resistance between said second flywheel and said first flywheel.

* * * * *